United States Patent
Voigt et al.

(10) Patent No.: US 9,651,380 B2
(45) Date of Patent: May 16, 2017

(54) INTEGRATED OPTICAL COUPLER AND FIBRE-OPTIC SYSTEM HAVING SUCH AN INTEGRATED OPTICAL COUPLER

(71) Applicant: Northrop Grumman LITEF GmbH, Freiburg (DE)

(72) Inventors: Sven Voigt, Freiburg (DE); Steffen Zimmermann, Teningen (DE)

(73) Assignee: Northrop Grumman LITEF GmbH (DE)

( * ) Notice: Subject to any disclaimer, the term of this patent is extended or adjusted under 35 U.S.C. 154(b) by 0 days.

(21) Appl. No.: 14/903,914

(22) PCT Filed: Jun. 30, 2014

(86) PCT No.: PCT/EP2014/001788
§ 371 (c)(1),
(2) Date: Jan. 8, 2016

(87) PCT Pub. No.: WO2015/003777
PCT Pub. Date: Jan. 15, 2015

(65) Prior Publication Data
US 2016/0153782 A1      Jun. 2, 2016

(30) Foreign Application Priority Data
Jul. 11, 2013   (DE) .................. 10 2013 011 641

(51) Int. Cl.
*G01C 19/72*    (2006.01)
*G02B 6/024*    (2006.01)
(Continued)

(52) U.S. Cl.
CPC ......... *G01C 19/722* (2013.01); *G01C 19/721* (2013.01); *G01C 19/725* (2013.01);
(Continued)

(58) Field of Classification Search
CPC .. G01C 19/722; G01C 19/721; G01C 19/725; G02B 6/30; G02B 6/024; G02B 6/4213
See application file for complete search history.

(56) References Cited

U.S. PATENT DOCUMENTS

| 5,319,440 A | 6/1994 | Kersey et al. |
| 5,377,283 A | 12/1994 | Blake et al. |

(Continued)

FOREIGN PATENT DOCUMENTS

| CN | 201318948 Y | 9/2009 |
| DE | 3786622 T2 | 1/1994 |

(Continued)

OTHER PUBLICATIONS

European Office Action for Application No. 14 734 006.1 dated Feb. 23, 2017.

*Primary Examiner* — Hwa Lee
(74) *Attorney, Agent, or Firm* — Tarolli, Sundheim, Covell & Tummino LLP

(57) ABSTRACT

The invention relates to an integrated optical coupler (1) comprising a substrate (3), at least two planar waveguides (4), which are arranged on or in the substrate (3) and consist of a material having a virtually isotropic refractive index (anisotropy of the refractive index of less than $10^{-6}$), and al least three monomode fibers (8, 9, 10) coupled to the planar waveguides (4). One of the monomode fibers (8) is a polarization-maintaining fiber. A fiber optic system according to the invention comprises an integrated optical coupler (1) according to the invention, a light source (21) that is suitable for generating light beams, and a first pigtail fiber (22), which is connected at one end to the light source (21) and at the other end to the polarization-maintaining fiber (8) of the integrated optical coupler (1).

8 Claims, 2 Drawing Sheets

(51) Int. Cl.
*G02B 6/30* (2006.01)
*G02B 6/42* (2006.01)

(52) U.S. Cl.
CPC ............... *G02B 6/024* (2013.01); *G02B 6/30* (2013.01); *G02B 6/4213* (2013.01)

(56) References Cited

U.S. PATENT DOCUMENTS

| | | | | |
|---|---|---|---|---|
| 6,563,587 | B1 * | 5/2003 | Bueschelberger | ... G01C 19/721 356/460 |
| 7,085,441 | B1 | 8/2006 | Kozlov | |
| 2014/0340690 | A1 * | 11/2014 | Lefevre | .................. G02B 6/125 356/483 |

FOREIGN PATENT DOCUMENTS

| | | |
|---|---|---|
| DE | 4433738 A1 | 3/1996 |
| DE | 60301553 T2 | 6/2006 |
| DE | 102011104512 A1 | 12/2012 |

* cited by examiner

INTEGRATED OPTICAL COUPLER AND FIBRE-OPTIC SYSTEM HAVING SUCH AN INTEGRATED OPTICAL COUPLER

The invention is concerned with an integrated optical coupler as well as with a fiberoptic system comprising such an integrated optical coupler.

Sensors for measuring of angular velocities as used for example in navigation systems or systems for analysis or control of movements or of the position of an object may comprise also interferometric fiberoptic gyroscopes (also called fiberoptic gyroscopes or fiber gyroscopes) instead of mechanical gyroscopes. These analyze interference of two light beams running in opposite directions in a coiled optical wave guide, wherein the interference results from a rotation of the optical wave guide around an axis perpendicular to the plane in which the wave guide is placed, because of the different transit times caused by the wave trains running in opposite directions. The intensity of interference is a measure for the rotation rate of the gyroscope.

Such a fiberoptic gyroscope comprises generally a light source, which generates the circulating light beams and which provides them via a pigtail optical wave guide, a coiled optical wave guide, an optical device for injecting the light beams in opposite directions into both ends of the coiled optical wave guide and for receiving the light beams, which have passed through the coiled optical wave guide, from opposite directions, as well as a detector, which determines the interference of the oppositely running wave trains. If the light source and the detector are realized in separated devices, an optical coupler is used in addition, which guides the light beams either from the light source to the optical device (to the coiled optical wave guide) or from the optical device (from the coiled optical wave guide) to the detector. The optical coupler may be embodied as integrated optical coupler in which the light beams are guided and branched via planar wave guides. Moreover, depending on the type of the used light source and the type of the fibers used for the pigtail guide and the optical wave guide, respectively, further components such as splices or depolarizers may be necessary.

It is an object of the present invention to provide an integrated optical coupler which is configured to reduce the number of components necessary in a fiberoptic gyroscope as well as configured to be manufactured cost efficiently. It is moreover an object of the invention to provide a fiberoptical system with such an integrated optical coupler.

This object is solved by the subject-matter of the independent claims. Preferred embodiments are provided in the dependent claims.

An integrated optical coupler according to the present invention comprises a substrate, at least two planar wave guides arranged on or in the substrate and made of a material having a virtually isotropic refractive index, and at least three mono-mode fibers coupled to the planar wave guides. The planar wave guides as well as the mono-mode fibers are configured to transmit light beams or light waves. To this end, one of the coupled mono-mode fibers is a polarization-maintaining fiber, while the other mono-mode fibers are polarization-non-maintaining fibers.

Preferably, no orientation of the polarization-maintaining orientation is provided, which may simplify the manufacturing process.

The material of the planar wave guide of the integrated optical coupler has an almost complete isotropy of refractive index with respect to its dependency from the propagation direction and to the polarization of the guided light. The expression "virtually isotropic refractive index" means that the anisotropy of the refractive index ($\Delta n$) is smaller than $10^{-6}$. According to an embodiment the material is glass. Besides a very small birefringence glass has very small wave guide attenuation. For example, the planar wave guides may be isotropic wave guides and may be provided as doped regions in an amorphous glass substrate, wherein the wave guides may have a circular or virtually circular profile. Such an embedded wave guide may for example be generated by diffusion of dopants and by integrating them into the substrate material by means of field supported ion exchange.

The integrated optical coupler may comprise two inputs and one output (2×1 coupler) or two inputs and two outputs (2×2 coupler).

According to an embodiment at least one of the coupled mono-mode fibers of the integrated optical coupler may comprise at the end of the fiber opposite to the planar wave guide a plug (pigtail), which allows for example coupling to another fiberoptic device.

A fiberoptic system according to the present invention comprises an integrated optical coupler according to the present invention, a light source configured to generated light beams and a first pigtail fiber that is connected with one of its end with the light source and with the other of its ends with the polarization-maintaining first mono-mode fiber of the integrated optical coupler.

The first pigtail fiber may also be a polarization-maintaining fiber.

If the first mono-mode fiber of the integrated optical coupler as well as the first pigtail fiber are polarization-maintaining fibers, the first pigtail fiber may be connected such to the first mono-mode fiber of the integrated optical coupler that the characterizing direction or the direction of tension of the first mono-mode fiber and the first pigtail fiber have an angle of 45° with respect to each other. This may be realized by a 45°-splice.

Moreover, the first pigtail fiber and the first mono-mode fiber of the integrated optical coupler may have a ratio of retardation length of 1:2 with respect to each other. In this case, the first pigtail fiber and the first mono-mode fiber form a Lyot-depolarizer, by means of which a separately provided Lyot-depolarizer may be omitted.

The system according to the present invention comprises a coiled optical wave guide, which can be rotated around an axis perpendicular to the plane, in which ft is placed, an optical device for injecting light beams generated from the light source in opposite directions into the two ends of the coiled optical wave guide and for receiving light beams after they have passed through the coiled optical wave guide from opposite direction, wherein the optical device is connected to a second mono-mode fiber of the integrated optical coupler, a detector configured to determine interference of the wave trains of the light beams received by the optical device, and a second pigtail fiber, having one end connected to the detector and having its other end connected to a third mono-mode fiber of the integrated optical coupler and configured to guide the light beams received by the optical device from the integrated optical coupler to the detector. Here, the system constitutes a one-axis fiber optic gyroscope. By providing respective further components, also fiberoptic gyroscopes having several axes may be realized.

If the second mono-mode fiber comprises a plug (pigtail) by which the second mono-mode fiber may be connected with the optical device, which may for example be a multi-functional integrated optical chip (MIOC), such a fiberoptic gyroscope can be manufactured with only two splices, i.e. for connecting the first pigtail fiber of the light source with to the first mono-mode fiber of the integrated optical coupler and for connecting the second pigtail fiber of the detector to the third mono-mode fiber of the integrated optical coupler. Due to the simplification of the manufacturing process caused by the reduction of additional components, and due to the use of price efficient realizations of components (e.g. polarization-non-maintaining fibers) a fiberoptic gyroscope with a medium range of accuracy (about 1°/h bias residual area) can be produced cost efficiently.

Embodiments of the present invention will be detailed in what follows based on the figures, wherein analog elements are denoted with the same reference signs.

Figure 1:
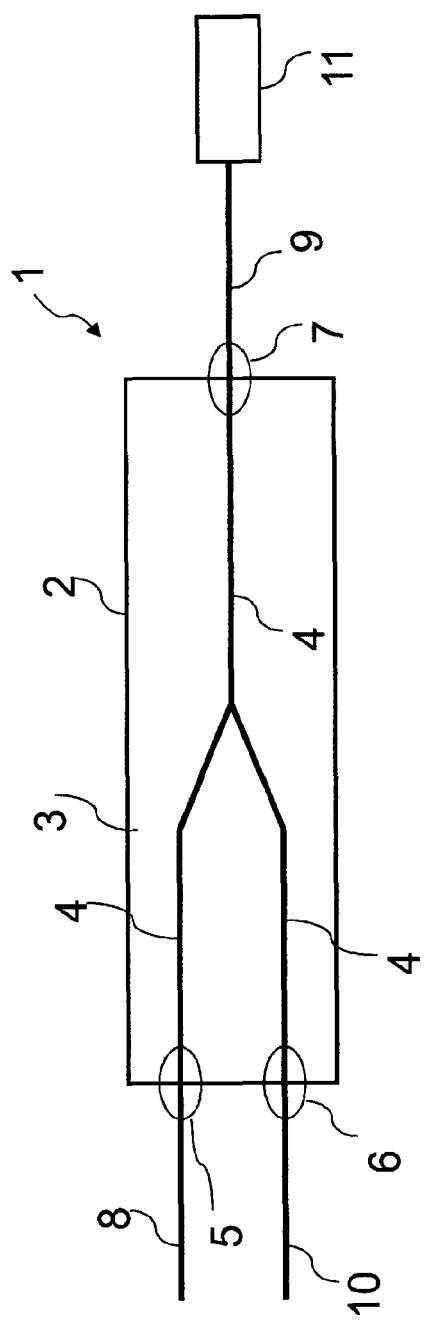
FIG. 1 shows a schematic illustration of an integrated optical coupler according to an embodiment of the invention.

The integrated optical coupler 1 illustrated in FIG. 1 comprises a wave guide chip 2 that comprises a substrate 3, at least two planar wave guides 4 arranged on or in the substrate 3, and a first and second input 5 and 6, and at least one output 7. The embodiment of the wave guide chip illustrated in FIG. 1 corresponds to a 2×1 coupler. The wave guide chip 2 may also comprise further inputs or outputs such that also other couplers may be realized, for example a 2×2 couplers with two inputs and two outputs. Here, the terms "input" and "output" do not define the propagation direction of light beams that are transmitted through the planar wave guides. In contrast, light beams may be transmitted from an input to an output as well as vice versa, i.e. from an output to an input. The planar wave guides 4 consist of a material having a virtually isotropic refractive index i.e. with an anisotropy of the refractive index of less than $10^{-6}$ ($\Delta n < 10^{-6}$). For example, the planar wave guides 4 may be formed of glass.

The integrated optical coupler 1 comprises further at least three mono-mode fibers 8, 9 and 10 coupled to the planar wave guides 4 on the inputs 5 and 6 or the output 7 of the wave guide chip 2. A first mono-mode fiber 8 is for example coupled at the first input 5 to one of the planar wave guides 4, while a second mono-mode fiber 9 is connected at the output 7 to one of the planar wave guides 4, and a third mono-mode fiber is connected at the second output 6 to one of the planar wave guides 4.

The planar wave guides 4 as well as the first, second and third mono-mode fiber 8, 9 and 10 are configured to transmit light beams or light waves.

The first mono-mode fiber 8 is a polarization-maintaining fiber, while the second and the third mono-mode fibers 9 and 10 may be fibers that do not maintain polarization (polarization-non-maintaining fibers).

A polarization-maintaining fiber (polarization-maintaining optical fiber (PMF or PM fiber)) is an optical fiber inside of which the polarization of an input linearly polarized light wave does not change during propagation inside the fiber, or differently stated inside of which only a very small (preferably no) cross coupling between the polarization modes of the fiber appears.

Different processes are used to generate polarization-maintaining fibers. Often a tension acts on the core of the fiber by using a non-circular cross section for the cladding or by embedding bars of other materials into the cladding.

Polarization-maintaining fibers maintain the existing polarization of linearly polarized light supplied into the fiber with a correct orientation ("oriented fiber"). If the polarization of the injected light is not aligned with the direction of tension of the fiber, a mixture of linearly and circularly polarized light is generated at the output of the fiber (generally it will be polarized elliptically).

According to the present embodiment an orientation of the polarization-maintaining fiber 8 is not necessary for the function of the integrated optical coupler 1. Hence, the integrated optical coupler 1 may just as well be manufactured cost-efficiently as an integrated optical coupler with three polarization-non-maintaining mono-mode fibers.

According to the illustrated embodiment of the integrated optical coupler 1 the second mono-mode fiber 9 has a plug (pigtail) 11 on its end that is not connected with the output 7 of the wave guide chip 2 and may be connected with that end to further optical components.

Figure 2:
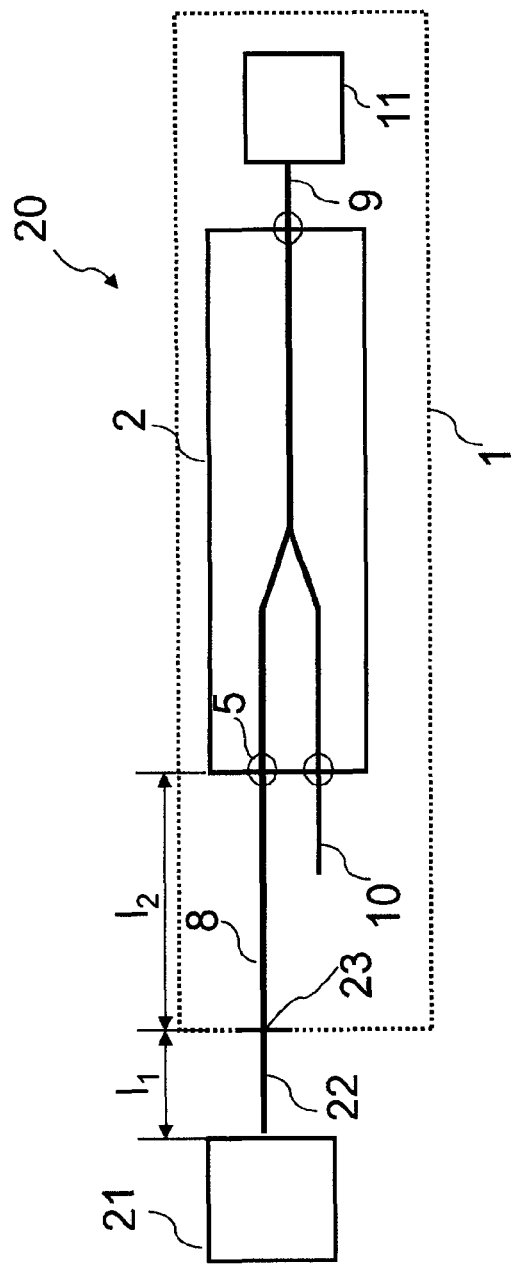
FIG. 2 shows a schematic illustration of a fiberoptic system according to an embodiment of the invention.

In FIG. 2 a first embodiment of a fiberoptic system according to the present invention is illustrated. The fiberoptic system 20 of the first embodiment comprises an integrated optical coupler 1 as illustrated for example in FIG. 1, as well as a light source 21 and a first pigtail fiber 22. The light source 21 is configured to generate transmittable light beams. Such a light source may for example be an SLD light source (super luminescent diode) or a super fluorescence light source (ASI-light source (amplified spontaneous emission-light source)) or another broad band light source. The first pigtail fiber 22 serves for transmitting the light generated by the light source 21 to the integrated optical coupler 1. The first pigtail fiber 22 is connected with its one end to the light source 21 and with the other of its ends to the first mono-mode fiber 8 of the integrated optical coupler 1. The connection to the first mono-mode fiber 8 may for example be realized by a first splice 23. However, also other possibilities for connecting the two fibers are possible, for example plugging of the fibers. The first pigtail fiber 22 is a polarization-maintaining fiber, which may be oriented as well as non-oriented. Also in this case use of a non-oriented fiber for the first pigtail fiber 22 allows a reduction of costs.

According to one embodiment the first pigtail fiber 22 and the first mono-mode fiber 8 may be connected such that the characterizing direction or the direction of tension of the first pigtail fiber 22 and the characterizing direction or direction of tension of the first mono-mode fiber 8 have an angle of 45' with respect to each other. For example, this may be realized by a 45°-splice.

Then, the first pigtail fiber 22 and the first mono-mode fiber 8 act as Lyot-depolarizer, if their directions of tension have an offset of 45° with respect to each other as described above, and if the fibers have a ratio of retardation lengths of 1:2. Here, the retardation length is the product of the geometric length and the difference of refractive indices ($\Delta n$) of the respective fiber. If the first pigtail fiber 22 and the first mono-mode fiber 8 have the same birefringence, i.e. the same difference of refractive indices for the ordinary and the extraordinary light beam, then the ratio of retardation length of the fibers corresponds to the ratio of the geometric length $l_1$ of the first pigtail fiber 22 to the geometric length $l_2$ of the first mono-mode fiber 8. Here, the length $l_1$ corresponds to the length of the first pigtail fiber 22 measured from the light source 21 up to the point of coupling with the first mono-mode fiber 8, for example up to the first splice 23, while the length $l_2$ corresponds to the length of the first mono-mode fiber 8 measured form the point of coupling with the first pigtail fiber 22 up to the input 5 of the wave guide chip 2. However, the first pigtail fiber 22 and the first mono-mode fiber 8 may also have different birefringence, for example the fibers may consist of different fiber types or of different charges of the same fiber type.

Figure 3:
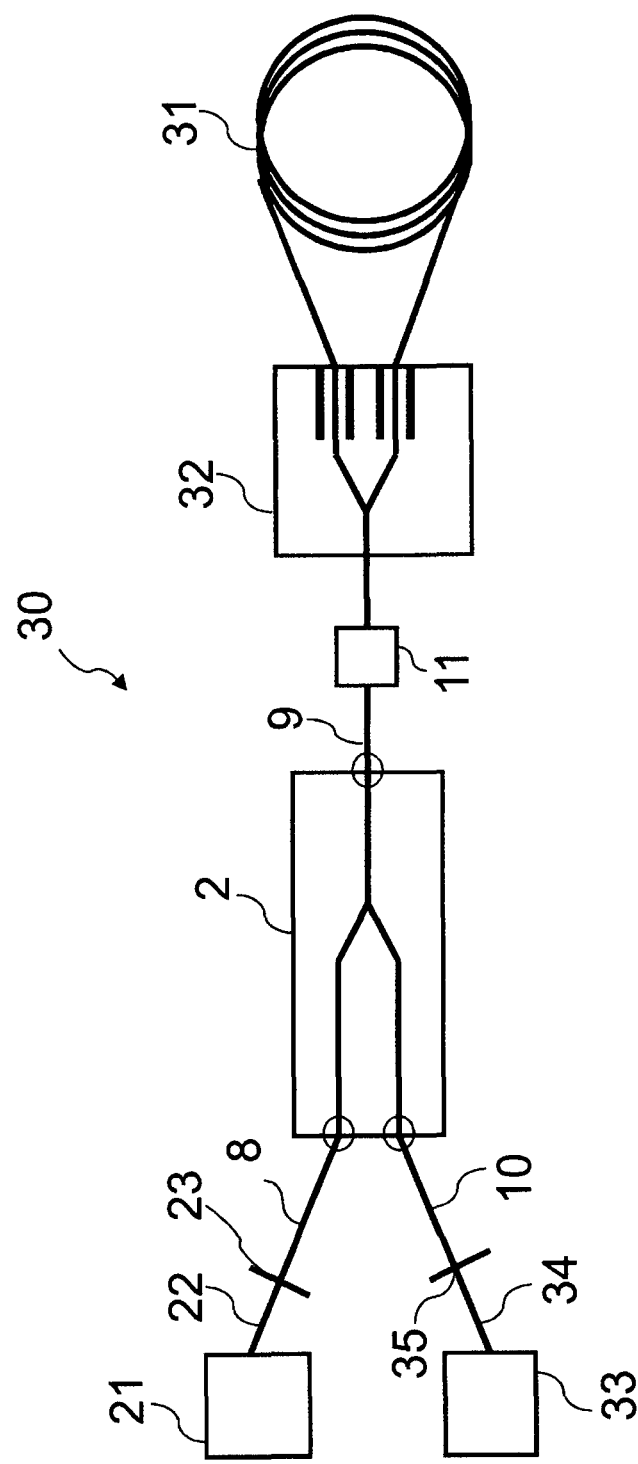
FIG. 3 shows a schematic illustration of a fiberoptic system according to another embodiment of the invention.

FIG. 3 shows a second embodiment of a fiberoptic system according to the present invention that corresponds to a fiberoptic gyroscope. The fiberoptic system 30 of the second embodiment comprises an integrated optical coupler according to the present invention as it is for example illustrated in FIG. 1, a light source 21 as well as a first pigtail fiber 22 that is connected to a first mono-mode fiber 8 of the integrated optical coupler by a first splice 23, a coiled optical wave guide 31 that can be rotated around an axis perpendicular to the plane in which it is placed, an optical device 32, as well as an detector 33, and a second pigtail fiber 34. For the integrated optical coupler as well as for the light source 21, the first pigtail fiber 22 and the first splice 23 the explanations made with respect to FIGS. 1 and 2 apply.

The both ends of the coiled optical wave guide 31 are connected to two outputs of the optical device 32. The optical device 32 may for example be a multifunctional integrated optical chip (MIOC) and is configured to inject the light beams generated by the light source 21 in opposite direction into the two ends of the coiled optical wave guide 31 as well as to receive the light beams from opposite directions after they have passed through the coiled optical wave guide 31 (in what follows also called returning light beams), and to transmit them to other components of the fiberoptic system. In the embodiment illustrated in FIG. 3 the returning light beams are transmitted to the integrated optical coupler. To this end, the input of the optical device 32 is connected to a second mono-mode fiber 9 of the integrated optical coupler. If the second mono-mode fiber 9 is provided with a plug 11 as illustrated in FIG. 1, the connection may be realized via the plug 11. Also with for the inputs and the outputs of the optical device 32 it holds that the expressions "input" and "output" do not indicate the propagation direction of light beams that are transmitted through the optical device 32.

The second pigtail fiber 34 is connected on one of its ends with to a third mono-mode fiber 10 of the integrated optical coupler, for example by means of a second splice 35. The other end of the second pigtail fiber 34 is connected to the detector 33. The detector 33 is configured to determine the interference of wave trains of the returning light beams that are transmitted from the optical device 32 via the third mono-mode fiber 10, the integrated optical coupler and the second pigtail fiber 34.

The embodiment of the fiberoptic system illustrated in FIG. 3 allows realizing of a single axis optical fiber gyroscope with only two splices, by which the manufacturing process may be simplified and made more cost efficient.

The invention claimed is:

1. An integrated optical coupler, comprising:
   a substrate;
   at least two planar wave guides arranged on or in the substrate and made of a material having a virtual isotropic refractive index; and
   at least three mono-mode fibers coupled to the at least two planar wave guides,
   wherein one of the at least three mono-mode fibers is a polarization-maintaining fiber and the other mono-mode fibers are polarization-non-maintaining fibers.

2. The integrated optical coupler of claim 1, wherein the material of the at least two planar wave guides has an anisotropy of refractive index of less than $10^{-6}$.

3. The integrated optical coupler of claim 1, wherein the material of the at least two planar wave guides is glass.

4. A fiberoptic system, comprising:
   an integrated optical coupler, comprising:
      a substrate;
      at least two planar wave guides arranged on or in the substrate and made of a material having a virtually isotropic refractive index; and
      at least three mono-mode fibers coupled to the at least two planar wave guides, one of the at least three mono-mode fibers being a polarization-maintaining fiber and the other mono-mode fibers being polarization-non-maintaining fibers;
   a light source configured to generate light beams; and
   a first pigtail fiber connected at one end to the light source and at an opposing end to the polarization-maintaining fiber of the integrated optical coupler.

5. The fiberoptic system of claim 4, wherein the first pigtail fiber is a polarization-maintaining fiber.

6. The fiberoptic system of claim 5, wherein the first pigtail fiber is coupled to a first one of the mono-mode fibers of the integrated optical coupler such that directions of tension of the first mono-mode fiber and the first pigtail fiber include an angle of 45° with respect to each other.

7. The fiberoptic system of claim 6, wherein the first pigtail fiber and the first mono-mode fiber of the integrated optical coupler have a ratio of retardation lengths of 1:2 with respect to each other.

8. The fiberoptic system of claim 4, further comprising:
   a coiled optical wave guide configured to rotate around an axis perpendicular to the plane in which the coiled optical wave guide is placed;
   an optical device configured to inject light beams generated by the light source in opposite directions into both ends of the coiled optical wave guide, and to receive light beams after having passed through the coiled optical wave guide from opposite directions, the optical device being connected to a second one of the mono-mode fibers of the integrated optical coupler;
   a detector configured to determine interference of wave trains of light beams received by the optical device; and
   a second pigtail fiber having one end connected to the detector and an opposing end connected to a third one of the mono-mode fibers of the integrated optical coupler, the second pigtail fiber being configured to guide light beams received from the optical device from the integrated optical coupler to the detector.

* * * * *

UNITED STATES PATENT AND TRADEMARK OFFICE
CERTIFICATE OF CORRECTION

| | | |
|---|---|---|
| PATENT NO. | : 9,651,380 B2 | Page 1 of 1 |
| APPLICATION NO. | : 14/903914 | |
| DATED | : May 16, 2017 | |
| INVENTOR(S) | : Sven Voigt et al. | |

It is certified that error appears in the above-identified patent and that said Letters Patent is hereby corrected as shown below:

In the Specification

Column 5, Line 56 reads "virtual" should read --virtually--

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*